(12) United States Patent
Meisner et al.

(10) Patent No.: US 6,862,102 B1
(45) Date of Patent: Mar. 1, 2005

(54) AUTOMATICALLY PREPARING AN IMAGE FOR DOWNLOAD

(75) Inventors: Douglas E. Meisner, Minneapolis, MN (US); Jon D. Clauson, Chanhassen, MN (US); Douglas C. Shimonek, Sioux City, IA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/300,348

(22) Filed: Apr. 27, 1999

(51) Int. Cl.⁷ .............................. G06F 15/00; G06K 9/36
(52) U.S. Cl. ...................... 358/1.15; 358/1.9; 382/243; 345/660; 709/247
(58) Field of Search ................................ 709/246, 247; 345/619, 660, 800, 815; 358/1.15, 1.9, 2.1, 3.04, 527, 403, 426.01, 426.02, 426.03, 426.13, 426.14, 426.16; 382/243, 244; 707/104.1, 513, 523, 526

(56) References Cited

U.S. PATENT DOCUMENTS

| | | | | |
|---|---|---|---|---|
| 5,553,160 A | * | 9/1996 | Dawson | 382/166 |
| 5,748,342 A | * | 5/1998 | Usami | 358/500 |
| 5,748,763 A | * | 5/1998 | Rhoads | 382/115 |
| 5,841,470 A | * | 11/1998 | Welsh | 375/240.1 |
| 6,012,068 A | * | 1/2000 | Boezeman et al. | 707/104.1 |
| 6,141,454 A | * | 10/2000 | Seymour et al. | 382/243 |
| 6,253,246 B1 | * | 6/2001 | Nakatsuyama | 709/233 |
| 6,278,449 B1 | * | 8/2001 | Sugiarto et al. | 345/826 |
| 6,289,118 B1 | * | 9/2001 | Cossey | 382/162 |
| 6,313,824 B1 | * | 11/2001 | Meisner et al. | 345/589 |
| 6,321,231 B1 | * | 11/2001 | Jebens et al. | 707/104.1 |
| 6,449,639 B1 | * | 9/2002 | Blumberg | 709/217 |

* cited by examiner

Primary Examiner—Joseph R. Pokrzywa
(74) Attorney, Agent, or Firm—Fish & Richardson P.C.

(57) ABSTRACT

A method and apparatus for preparing an image for downloading over a link. The method includes receiving a user selection for an image to prepare, retrieving current user settings reflective of desired settings for compressing the image and automatically presenting a plurality of variations of the image to the user where each variation is derived using compression settings that are scaled from the current user settings.

44 Claims, 5 Drawing Sheets

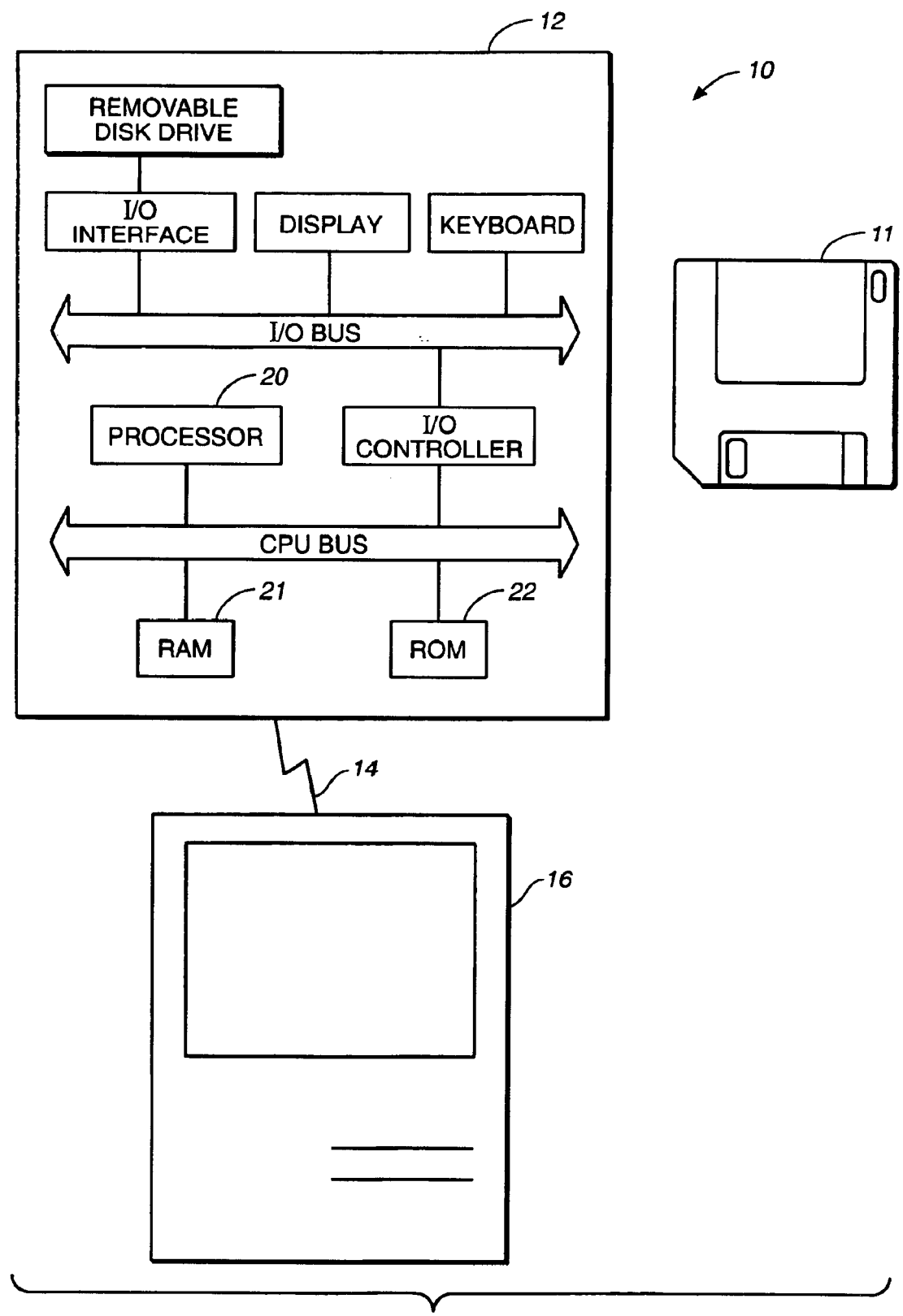
FIG._1

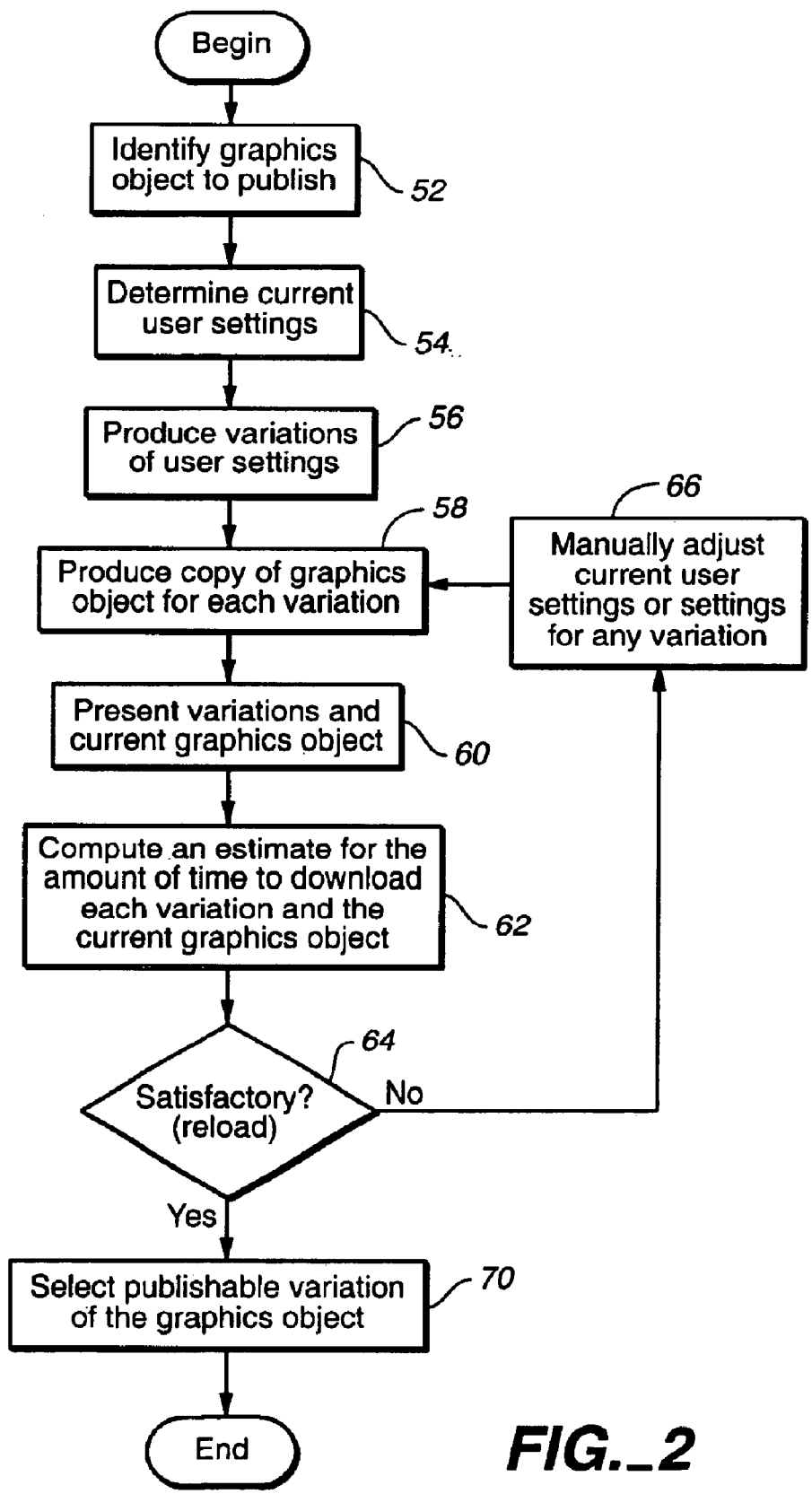
FIG._2

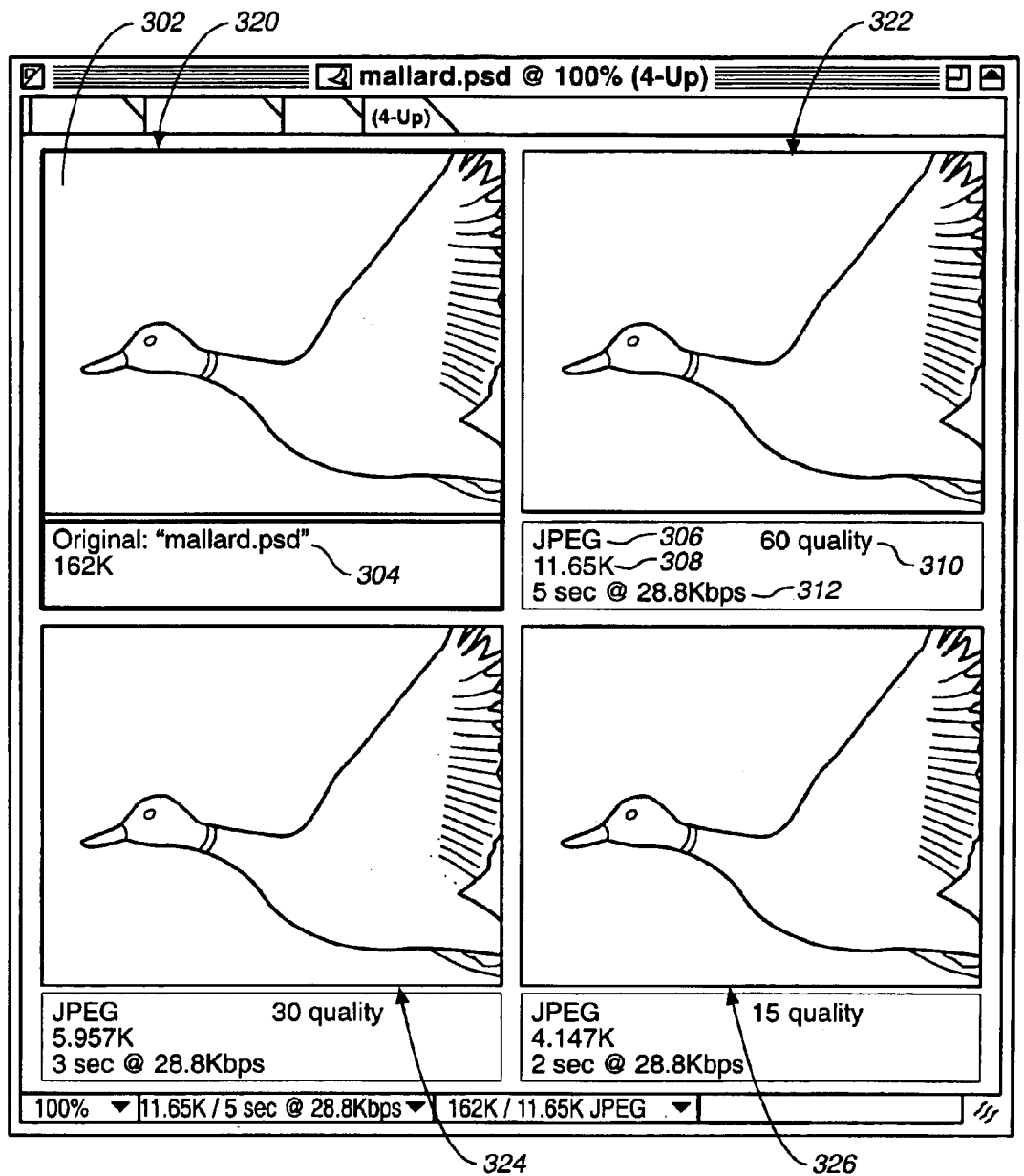
FIG._3

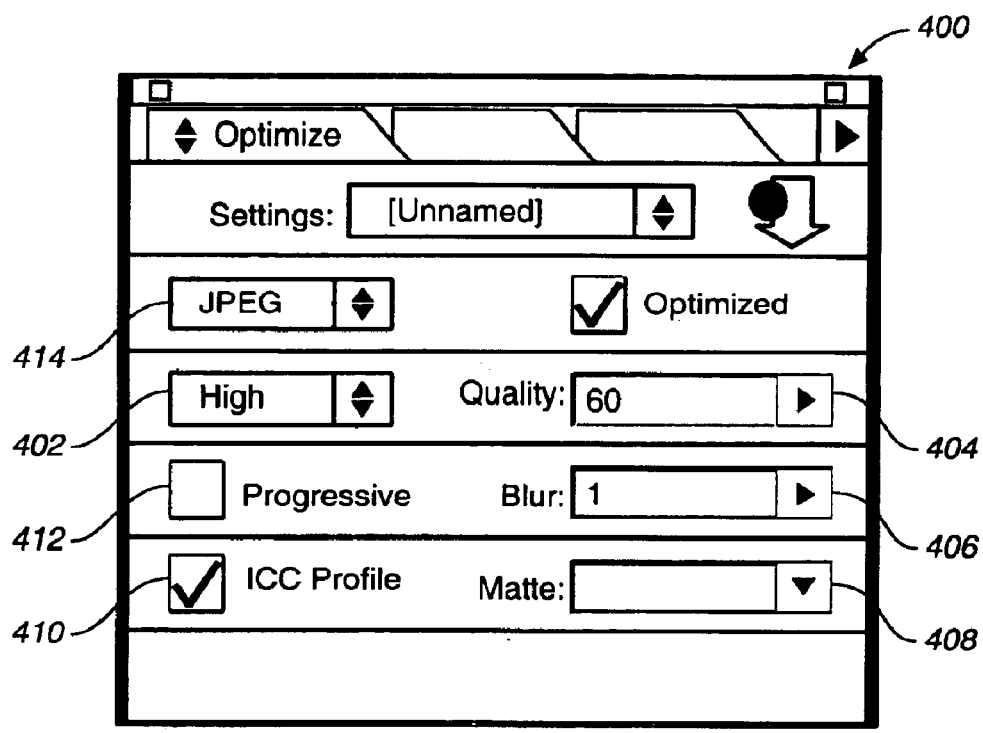
FIG._4A
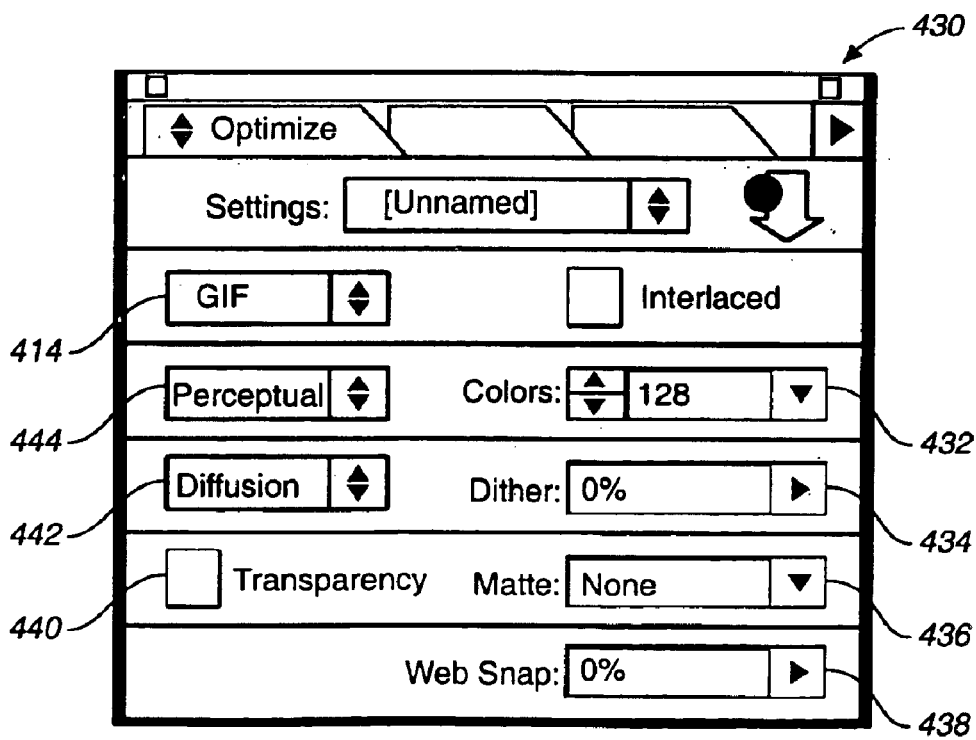
FIG._4B

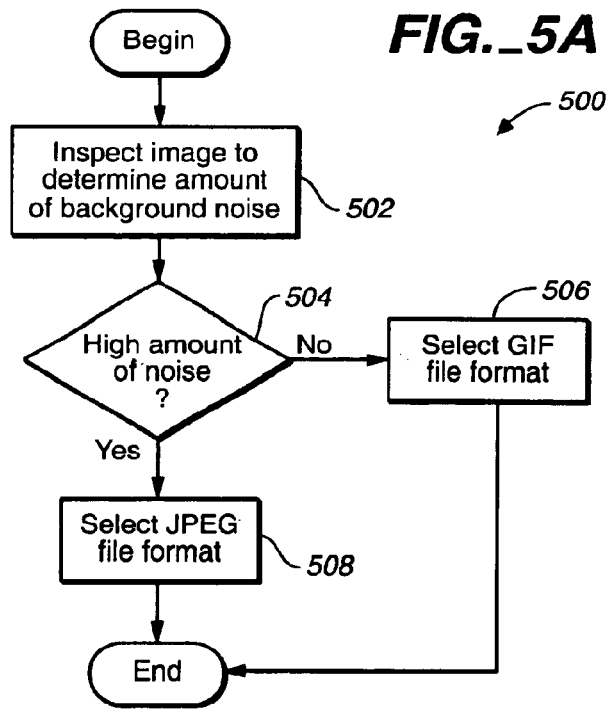
FIG._5A
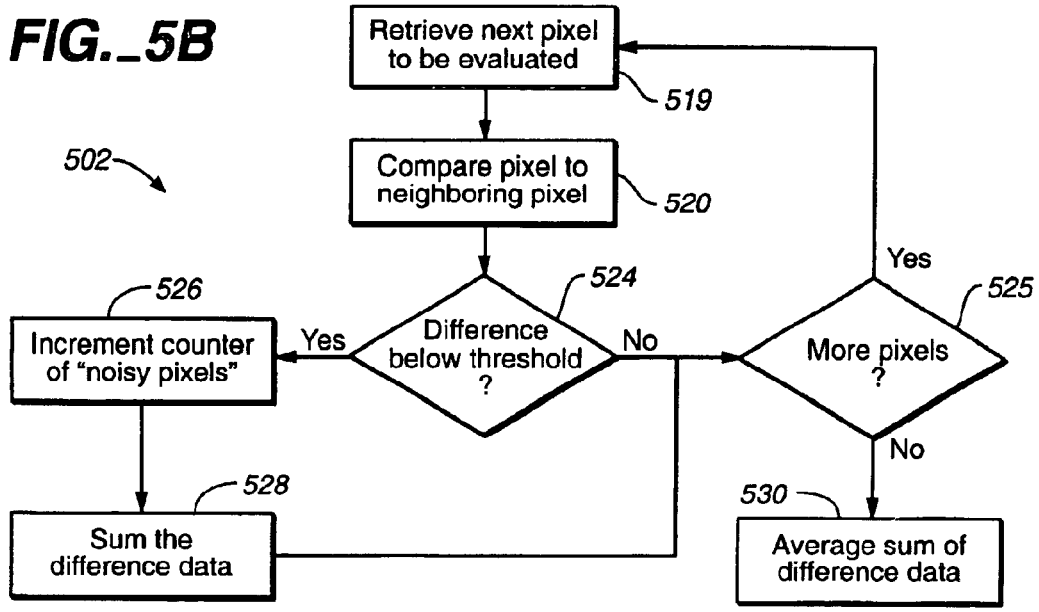
FIG._5B

AUTOMATICALLY PREPARING AN IMAGE FOR DOWNLOAD

The present invention relates generally to processing computer images for publishing purposes.

BACKGROUND

The proliferation of the Internet has provided numerous business opportunities for the exploitation of information. A web site is a conventional means for presenting information to a user traversing on the World Wide Web. Graphics are often used to capture the attention of a user visiting a web site. One problem that often arises in the development of web sites is the format of the graphics data that is to be presented. More specifically, users often experience delay while graphics objects are downloaded for presentation on a user display. The delay associated with the publication of a graphics object is related to the both the format of the data (e.g., file format) and the compression used when storing the data that is retrieved.

At least two graphic file formats are universally compatible with World Wide Web browsers: GIF and JFIF/JPEG. The joint photographic experts group (JPEG) compression standard is supported by the JFIF file format. As used herein, the "JPEG" or "JPEG/JFIF" format refers to files that are formatted in accordance with the JFIF format that include data compressed using the JPEG compression standard. A key element for creating successful graphics for web pages is reducing the file size for rapid downloads. Because compression has negative side effects such as artifacts, the web site developer is tasked with determining the optimum trade off between file size and image quality. In order for the graphics to be visually effective, the image quality must be maintained at an appropriate level. At the same time, the file size should be minimized to reduce the delay when downloading the graphics object.

SUMMARY

In one aspect the invention provides a method of preparing an image for downloading over a link and includes receiving a user selection for an image to prepare, retrieving current user settings reflective of desired settings for compressing the image and automatically presenting a plurality of variations of the image to the user where each variation is derived using compression settings that are scaled from the current user settings.

Aspects of the invention include numerous features. The method can include estimating an amount of time required to download a given variation to the user where the estimated time is calculated from an assumed transmission rate of the link. The method can including determining a file format for the image and using the current user settings designated for the file format in presenting a representation of the image.

The step of determining a file format can include determining an optimum file format for the image based on a predominant nature of the image data and determining a predominant form for objects in the image. The step of automatically presenting can include scaling compression settings from the current user settings where the particular settings that are scaled depend on the predominant form of the image. The predominant form is selected from the group of photographic and line art.

Additionally, the method can include determining if the predominant form is photographic. If so, the optimum file format can be set to a JPEG/JFIF format. If the predominant form is line-art, the optimum file format can be set to a GIF format.

The step of determining an optimum format can include calculating an amount of noise in the image, setting the optimum file format to a JFIF format if the amount of noise is above a predefined threshold, and otherwise setting the optimum file format to a GIF format. The step of calculating an amount of noise can include, for each pixel in the image, comparing a relative color change between the pixel and one or more adjacent pixels to derive relative color change data, determining an overall color change for the image using the relative color change data for each pixel and comparing the overall color change to the threshold value.

The step of comparing the relative color change can include deriving a first set of color change data for a pixel by comparing the color of the pixel with a pixel immediately next in raster order, deriving a second set of color change data for the pixel by comparing the color of the pixel with a pixel at a same location in a next scanline of pixels for the image and for each color change data set, summing all the color change data and averaging over the image.

The step of comparing a relative color change can determine an actual color difference irrespective of a perceptual color difference. The step of determining an optimum file format can include inspecting the image to determine if any pixel in the image is transparent. If a pixel is transparent, the optimum file format can be set to a GIF format.

The step of determining an optimum file format can include inspecting the image to determine if the image includes more than one animation frame. If more than one frame is detected, the optimum file format can be set to a GIF format.

The step of automatically presenting can include receiving a user selection that defines a number of automatically derived variations that are to be presented to the user and automatically generating the number of variations selected.

The method can include adjusting the scaling of the current user settings for each variation depending on the number of automatic variations that are to be presented and displaying the image at the current user settings. The method can include displaying the image at current user defined compression settings along with three variations in a four-up orientation on an output display device. A first variation can be generated by scaling the current user settings and a second variation can be derived by scaling the scaled user settings used in deriving the first variation.

The method can include receiving user modifications to the current user settings used to derive a variation and redisplaying the variation at a compression level using the modified user settings. Settings for each variation can be recalculated using the modified user settings and each variation can be redisplayed at a compression level using modified user settings. Each variation can be a smaller and lower quality version of the image when produced using the current user settings. The estimated download time can be presented along with each variation of the image.

In another aspect, the invention provides a computer program for preparing an image for downloading over a link. The computer program includes instructions for causing a computer to receive a selection from a user designating an image to download, retrieve current user settings reflective of desired settings for compressing the image and automatically present a plurality of variations of the image to the user where each variation is derived using compression settings that are scaled from the current user settings.

Advantageous implementations of the invention can include one or more of the following advantages. A system is provided to produce a quick automatic means of presenting variations of a graphics object to a web site developer including relative time versus data quality for web publishing purposes. The invention can be used to determine an optimum file format for a graphics object. Background noise in the image data can be automatically evaluated to discern whether the image data is line art or a photograph. A statistical analysis process can be used to establish baselines for the amount of background noise found in exemplar graphics objects. The results from the exemplar samples can be compared to a selected graphics object. An appropriate file format for download can be automatically selected using the comparison data. An automatic process for determining the optimum tradeoff between file size and image quality is presented.

These and other advantages of the present invention will become apparent from the following description and from the claims.

BRIEF DESCRIPTION OF THE DRAWINGS

FIG. 1 is a schematic block diagram of a computer system for use in producing a web site.

FIG. 2 is a flow diagram for a process of selecting a graphics object for publication in a web site.

FIG. 3 shows a user interface presented when invoking the process described with FIG. 2.

FIG. 4a is a dialog box presented in the user interface for JPEG file format images.

FIG. 4b is a dialog box presented in the user interface for GIF file format images.

FIG. 5a is a flow diagram for a process of selecting an optimum file format for an graphics object.

FIG. 5b is a flow diagram for the inspection step provided for in the flow diagram of FIG. 5a.

DETAILED DESCRIPTION

It is common for web site developers to select graphics objects for inclusion in a web site. Web site developers use conventional applications for constructing a web site that includes one or more web pages. Examples of applications for constructing a web site include GoLive™ and PageMill™ available from Adobe Systems Incorporated of San Jose, Calif. Conventional web site construction applications include tools for designating graphics objects to be included on web pages. A selection tool can be used to select a graphics object file for inclusion in the web site. However, conventional selection tools cannot ascertain the optimum file format for the graphics object file. Typically, the user selects the graphics object and incorporates the object in its current form into a web page. Depending on the file format and the compression used, a user accessing the web page and downloading the graphics object may experience an unacceptable delay. The delay is typically evaluated after the user has completed the construction of the web site and the final hypertext mark-up language (HTML) for the web site is produced. If the delay is unacceptable, then the web site can be reconstructed. The present invention includes a solution for this problem that includes automatically presenting a web site developer with information sufficient to make the quality versus performance decision at the time graphics objects are selected and prior to incorporation into the final HTML.

A number of terms are used herein to describe images and related structures. "Digital image," as used herein, refers to a collection of digital information that may be cast into the form of an image. The term image is used to describe a type of visual representation or object type. Digital images may include photographs, artwork, documents, and web pages, for example. Images may be obtained from digital cameras, digital video, scanners, and facsimile devices, for example. The images may be two-dimensional or of higher dimensionality. For example, three-dimensional images may include representations of three dimensional space or of two dimensional movies where the third dimension is time.

"Pixel" refers to an element of a digital image which has a specific location in the image and contains color information for that location. When referring to a displayed visual representation, a pixel is a single picture element of the displayed visual representation. Each pixel is composed of one or more components, one for each colorant (e.g., red, green and blue in an RGB color system) used in a particular color system. Each component, in turn, uses one or more bits to represent a gray scale value. Taken collectively, the pixels form the representation.

"Color" is used to represent a vector of values which characterizes all of the image information. This may include the amount of transparency or translucence associated with the particular portion of the digital image.

In FIG. 1, a computer system 10 suitable for creating web sites and automatically presenting developers with variation data for optimizing the selection of downloaded images includes one or more digital computers 12, a communications bus 14 and an output display device.

Digital computer 12 can be a personal computer, a workstation, or other kind of general or special purpose digital computer, including an embedded computer. Computer 12 typically includes a microprocessor 20, a memory bus, random access memory (RAM) 21, read only memory (ROM) 22, peripherals such as input devices (e.g., keyboard and pointing device), and storage devices (e.g., hard disk drive). The storage devices can contain an operating system and one or more applications including a web site development application in accordance with the present invention. Alternatively, the applications can be stored on other media, such as floppy disk 11.

The output display device can be a display, or other output device. Other output display devices include, for example, printers, projection devices, and plotters. For the purposes of this disclosure, reference will be made to a display 16.

Display 16 is an output display device that can produce a visual representation of a document, including an image, on a screen. The representation is generally an arrangement of pixels arranged in rows and columns of a raster.

The process of the present invention, as described below, provides a technique for creating web sites including selecting graphics objects for inclusion in the final HTML for the web site that have an optimum format and which are stored using appropriate compression to satisfy speed versus quality considerations.

FIG. 2 is a flow chart of user and program steps for selecting graphics objects for downloading. A web graphics construction application includes a user interface for viewing content to be included in the web site. The application includes numerous tools including a selection tool for selecting graphics objects for inclusion in the web site. The process begins by manipulating the selection tool to identify a graphics object to be published (52). The graphics object can be of a known file format or an file format type can be determined for the graphics object. A process for determining an optimum file format is described in greater detail below in reference to FIGS. 5a and 5b.

The current user settings for compression are determined (54). User settings can be manipulated by the user through the user interface. The web graphics construction application includes a preferences tool for designating user preferences to be invoked during the execution of the application. In one implementation, the application presents a preferences menu that includes default settings for controlling the compression of objects that are to be downloaded for inclusion in the web site. The user can manipulate settings for numerous compression parameters as is discussed in greater detail below. One setting designated by the user configures the user interface to display a user defined number of variations of a selected graphics object as described below. The number of variations in one implementation is two or four, in a 2-up or 4-up orientation. Customized user settings configurations can be stored by the application for later retrieval. The phrase "current user settings," refers to the particular user setting configuration that is active at the time a graphics object is selected for presentation. The current user settings can be a default set, characterized by default values set in the preferences menu, or a custom set either created or retrieved by the user.

When an object is selected for publishing (inclusion in the web page), compression parameters designated in the current user settings are used to produce a downloadable representation of the graphics object for presentation to the user. The particular compression parameters used are determined based on the graphics object type (file type, GIF or JPEG) and the selections indicated in the current user settings.

One or more variations of the current user settings are produced (56). Each variation is used to compress and produce a downloadable representation of the graphics object (58). The graphics objects produced for each variation are presented along with a compressed version of the graphics object produced using the current user settings (60). A time estimate associated with the amount of time required to download the graphics object file at a given modem speed for each of the variations is also computed (62). In one implementation, up to four views are presented by the web graphics construction application for display to the user. If the variations presented are not satisfactory (64), the user can adjust manually one or more of the user settings for any one of the views (66). One or more adjusted views can be used to produce a new set of variations of the graphics object for presentation to the user (steps 58–62). After the views are presented, the user can select an appropriate version of the graphics object for inclusion into the web page, easily evaluating both quality and performance considerations (70). Thereafter, the process ends.

The views are populated according to user preference settings. As described above, the preference settings include a designation of a number of variations to automatically produce. In one implementation, a compressed version of the graphics object is displayed along with three variations in a four-up display as part of the user interface shown in FIG. 3. Other configurations can for the numbers and kinds of variations can be elected by the user, including automatically producing variations that scale up from the current user settings or producing only variations of the graphics object without producing a representation of the graphics image compressed at the current user settings. The user interface includes a display region 300 that displays a representation of the graphics object produced using the current user settings and the variations described above. Associated with each image file is an image portion 302 and a data portion 304. Image portion 302 shows a downloadable compressed version of the graphics object produced in accordance with compression settings (the current settings or automatically modified version of the current user settings) for the particular view and showing any artifacts introduced by the compression. Data portion 304 includes fields for the file type 306, file size 308, compression quality 310 and includes a time estimate 312 associated with the time required to download the image data (graphics object) when publishing the web page. View 320 is populated with a compressed version (the "current" version) of the graphics object produced using the current user settings. Views 322, 324 and 326 are populated automatically with variations produced by modifying the current user settings. In one implementation, the user can adjust user settings for ones of the views manually while designating other views to be generated automatically.

The modifications to the current user settings for a particular view (variation) can depend on the number of variations presented. If the user designates three views to be automatically produced, then the modifications to the current user settings can be cumulative across the three variations presented. For example, the quality setting on the first variation produced can be cut in half, for the second variation cut in half again and so on.

In one implementation each of the variations is produced based on a cumulative scaling of the user settings. That is, a first variation is produced by scaling the current user settings. A subsequent or second variation is produced by scaling the scaled user settings used in producing the first variation. The user can specify the number of variations that are automatically computed. Alternatively the user can manually specify the user settings to be used in producing a variation of the current user settings which can in turn be displayed along with the current form of the graphics object.

The current user settings define a set of optimized compression settings for use when producing a downloadable variation of the graphics object. In one implementation, default settings are provided for both accepted file formats used on the World Wide Web: JPEG and GIF. Alternatively, a user can specify particular current settings for each individual file format type. The default or customized settings (the current settings) are used in producing the downloadable version of the graphics object presented in the first view.

The user interface presented when manipulating the selection tool can include a dialog box that specifies user settings for one of the views presented. In one implementation, the dialog box is configured to include the user settings applied to produce a selected view. A view can be selected by the selection tool, resulting in the display of the user settings used in producing the selected view. The dialog box can be presented along with the views and can be manipulated by the user for producing a re-populated view. The process of re-populating views is described in greater detail below. In one implementation, the dialog box is presented in a floating palette that can be selected by the user for viewing or customizing user settings for each of the views.

The user settings that can be adjusted in customizing the compression of the graphics object vary depending on the graphics object file format type that is selected for download. For the JPEG file format, the user settings that can be adjusted are as shown in dialog box 400 presented in FIG. 4a. Dialog box 400 can be displayed in the user interface as part of the preferences menu, or can be called from the preferences menu. The current settings for alternate formats can be viewed by toggling format setting 414. When a view is selected as described above, a dialog box similar to dialog box 400 (depending on the file format of the graphics object selected) is presented in the user interface for describing the particular settings used in producing a selected view. User adjustable settings for JPEG file format images include coarse image quality 402, fine image quality 404, blur 406, matte 408, ICC profile 410 and compressor selection 412. Image quality can be adjusted using coarse image setting 402 or fine image setting 404. The coarse settings available include low, medium, high and maximum which correspond to fine settings of 10, 30, 60 and 80 quality units (JPEG quality values). Blur setting 406 adjusts the level of Gaussian blur to be applied prior to compression. Matte setting 408 indicates whether a matte color is to be applied prior to compression partial transparent object). An ICC profile used in generating the representation can be included along with the graphics object if ICC profile setting 410 is selected. Compressor selection 412 defines the particular compressor (compression algorithm) to be used in the compression of the representation.

In one implementation, the automatic modification to the current user settings for JPEG format images for a given variation depends on the number of automatic variations to be produced. If three automatic variations are to be displayed, the first variation is produced by scaling the current quality setting 402 by 75%. Note the current quality setting is the quality setting specified in the current user settings. The second automatic variation is produced by scaling the current quality setting by 50%, and the third by scaling the quality setting 402 by 25%. If only two automatic views are produced, then the first automatic variation is produced by scaling the current quality setting by 50%, and the second by scaling the quality setting 402 by 25%. If only one automatic view is produced, then the first automatic variation is produced by scaling the current quality setting by 50%.

For the GIF file format, the user settings that can be adjusted are as shown in dialog box 430 presented in FIG. 4b. User adjustable settings include color setting 432, dither setting 434, matte 436, Web snap 438, transparency setting 440, dither type 442, and color selection 444. Color setting 432 indicates the number of colors used in the representation. The dithering type setting 442 is used to select a dithering algorithmn, while dithering setting 434 can be used to adjust the percentage of dithering applied. In one implementation, a diffusion dithering algorithm can be selected or no dithering. Matte setting 408 indicates whether a matte color is to be applied prior to compression (for a partially transparent region). Web snap setting 438, when selected, automatically takes colors in a color palette and snaps them to Web Safe colors (colors defined in a Web palette). Alpha channel data for use with images that include transparency can be included along with the graphics object if transparency setting 440 is selected. Color selection setting 444 allows for the selection of a particular color selection algorithm. In one implementation, the available color selection algorithms are: selective, adaptive, Web for Web Safe colors, custom, Mac-OS, and Windows.

In one implementation, the automatic modifications to the user settings for GIF format images depend on the number of automatic variations to be produced. If three automatic variations are to be displayed, the first variation is produced by halving the number of colors using the colors setting 432. The second automatic variation is produced by keeping the color setting at the original value and adjusting the dithering setting 434. The second variation is produced for the same number of colors but the dither is flip flopped between zero or one hundred percent, depending on the initial setting. The third variation is produced by reducing the number of colors.

If the number of colors in the default setting is greater than 16 then the number of colors is divided by 4. If the number of colors is less than 16, then the number of colors used in the third variation is set to four colors. While the GIF format is considered to be lossless, the manipulation of the number of colors results in a lossy type GIF compression.

As described above, in one implementation the invention presents four copies of the graphics object and adjusts key compression settings starting from a users current settings. Each of the new versions is a smaller/lower quality variation of graphics object produced using the current user settings. Along with the image data, an estimated download time is displayed beneath each variation. The simultaneous display of plural variations of the graphics object and respective download times allows the user to quickly compare the quality versus time consideration and select an appropriate format for inclusion in the web site. The user can then select the best version for the purposes required. The selected variation can be saved as part of the web site or fine tune adjustments to the settings may be made. The current user settings can be manipulated by selecting the current graphics object view. Thereafter the views can be automatically with new variations based on modifications to the new current user settings. Alternatively, individual variations can be selected and their respective user settings adjusted. Once changed, the variation can be reloaded producing a new variation in accordance with the adjusted user settings. When fine tune adjustments to the settings are produced, the user can select a reload or repopulate option which repeats the automatic population of views based on the new settings.

Occasionally, the file format (or optimum file format) for a graphics object may be unknown. When the object is selected for inclusion in the web site, the file format is used along with other user settings to compress the graphics object and produce a downloadable version for inclusion in the web site. If the file format is unknown (or not optimum), the file format type can be determined so that an appropriate compression technique is applied to the data.

FIG. 5a is a flow chart of user and program steps for automatically selecting an optimum file format for a graphics object file (500). The process begins by inspecting the graphics object (image) to determine the amount of background noise contained within the image (502). If a low amount of background noise is present (504), the image is determined to be of the type similar to a line-art and a GIF file format is selected (506). If the image includes a high amount of background noise, the image is determined to be of a type similar to a photograph and a JPEG format is selected (508). In this implementation, images with large amounts of background noise are assumed to be photographs and those with small amounts of noise are assumed to be line-art.

Process step 502 for inspecting the image includes numerous individual steps. Referring now to FIG. 5b, the process begins by retrieving a next pixel to be evaluated (519). The system compares the pixel to a neighboring pixel to determine a color difference (520). In one implementation, the neighboring pixel is a pixel immediately adjacent to the current target pixel and one pixel later in the current scan line. A color comparison is performed producing color difference data as a function of the relative color change between the two pixels. The color comparison can be calculated by squaring a difference value derived from subtracting the color value for one pixel from the color value for the other. In one implementation, the color data for each pixel includes a plurality of color values, one for each color component in the color space for the image. Difference values are produced for each color component on a component by component basis.

If the difference data is below a first predefined threshold value (524), then the pixel pair is considered to be part of the background noise. A counter is incremented to accumulate the total number of pixels deemed part of the background noise (526). The difference data for the individual pixels are summed across the image resulting in an overall sum of color differences for the entire image (528). If the difference data is above the first predefined threshold value (524), then the pixel pair is considered not to be part of the background noise and the process continues at step 525.

After all the pixels have been processed (525), the sum of the difference data is evaluated to determine the amount of background noise present. In one implementation, the sum of the difference data is averaged (530) and compared to a second predefined threshold value (step 504 of FIG. 5a). If the sum is above the second predefined threshold value, then the image is deemed to be of the same type as a photograph and a JPEG format is selected (Step 508 of FIG. 5a). If not, the image is deemed to be of the same type as line-art and the GIF format is selected (step 506 of FIG. 5a). Thereafter, the process ends.

In one implementation, each pixel is compared to two pixels. The two different pixel locations are then individually summed over the entire image area. In one implementation, the comparison occurs "horizontally" by comparing each target pixel to an adjacent pixel in the same scanline (the next pixel). A second comparison, the "vertical" comparison, is made between each pixel and the pixel immediately beneath the current pixel (at a same position, one scanline later). The difference sums are computed independently. Again, after all the pixels of an image have been examined for color differences, the overall sum of the color differences is averaged and compared to the second threshold value. More specifically, the sum of all of the horizontal comparisons is averaged. Similarly, the sum of all the vertical color differences is averaged. Each of the averaged sums is independently compared to the second threshold in order to determine an optimum format for the image. In one implementation, the threshold values are experimentally determined using a set of sample photographic and line art images.

In one, implementation, a check is additionally made to determine if a pixel is encountered in the image that has an opacity of less than 100%. If an image has pixels having an opacity of less than 100%, then a portion of the image is transparent with regard to some background image. Since transparency is not supported by the JPEG format, a GIF format is used. In one implementation, the alpha channel data associated with a color pixel can be evaluated to determine the transparency or opacity of a given pixel. In addition, a matte color can be used to fill a transparent region if the image is partially transparent (somewhere between fully transparent and fully opaque).

In one implementation, a check is additionally made to determine if the image includes more than one frame. Images having more than one frame (animated images and the like) are not supported by the JPEG format. The system selects the GIF format for images with more than one frame.

The present invention computes a color distance in terms of an actual color distance between pixels. The actual color distance is a numerical value as opposed to a perceptual color difference where the colors are weighted. Those ordinarily skilled in the art will recognize that the first threshold provides a screen for dramatic color changes that are included in the image. The second threshold is a measure of an average of background noise for images having a type similar to photographs.

The present invention has been described in terms of specific embodiments, which are illustrative of the invention and not to be construed as limiting. The invention may be implemented in hardware, firmware or software, or in a combination of them. Other embodiments are within the scope of the following claims.

What is claimed is:

1. A method of preparing an image for downloading over a link, the method comprising:

receiving a user selection for an image to prepare for downloading over a link;

retrieving current user settings reflective of desired settings for compressing the image, the current user settings defining a first compressed file size for the image;

automatically deriving alternative compression settings, the alternative compression settings including compression settings scaled from the current user settings and defining alternative compressed file sizes for the image, the alternative compressed file sizes being different from the first compressed file size; and substantially simultaneously displaying to a user a plurality of variations of the image where at least one variation is generated using current user settings and at least one variation is generated using one or more of the alternative compression settings that define an alternative compressed file size of the variation.

2. The method of claim 1, further including estimating for each variation of the image a respective amount of time required to download the variation to the user where the estimated time is calculated from an assumed transmission rate of the link and a compressed file size defined for the variation.

3. The method of claim 1, further including determining a file format for the image and using the current user settings designated for the file format to generate a variation of the image.

4. The method of claim 3, wherein the step of determining a file format determines an optimum file format for the image based on a predominant of the image data.

5. The method of claim 4, wherein the step of determining an optimum file format for the image includes determining a predominant form for objects in the image and the step of automatically deriving includes scaling compression settings from the current user settings where the particular settings that scaled depend on the predominant form of the image.

6. The method of claim 5, wherein the predominant form is selected from the group of photographic and line art.

7. The method of claim 6 further comprising determining if the predominant form is photographic and if so, setting the optimum file format to a JPEG/JFIF format.

8. The method of clam 6 further comprising determining if the predominant form is line-art and if so, setting the optimum file format to a GIF format.

9. The method of claim 4, wherein the step of determining an optimum format includes:

calculating an amount of noise in the image;

setting the optimum file format to a JFIF format if the amount of noise is above a predefined threshold, and otherwise setting the optimum file format to a GIF format.

10. The method of claim 9, wherein the step of calculating an amount of noise includes:

for each pixel in the image,
   comparing a relative color change between the pixel and one or more adjacent pixels to derive relative color change data;
   determining an overall color change for the image using the relative color change data for each pixel; and
   comparing the overall color change to the threshold value.

11. The method of claim 10, wherein the step of comparing the relative color change includes deriving a first set of color change data for a pixel by comparing the color of the pixel with a pixel immediately next in raster order.

12. The method of claim 11, wherein the step of comparing the relative color change includes deriving a second set of color change data for the pixel by comparing the color of the pixel with a pixel at a same location in a next scanline of pixels for the image.

13. The method of claim 12, wherein the step of determining an overall color change includes for each color change data set, summing all the color change data and averaging over the image.

14. The method of claim 9, wherein the step of determining an overall color change includes summing all the color change data for the image and averaging over the image.

15. The method of claim 9, wherein the step of comparing a relative color change determines an actual color difference irrespective of a perceptual color difference.

16. The method of claim 4, wherein the step of determining an optimum file format includes:
   inspecting the image to determine if any pixel in the image is transparent; and if so, setting the optimum file format to a GIF format.

17. The method of claim 4 wherein the step of determining an optimum file format includes:
   inspecting the image to determine if the image includes more than one animation frame; and
   if so, setting the optimum file format to a GIF format.

18. The method of claim 1, wherein the step of presenting a plurality of variations includes receiving a user selection that defines a number of variations that are to be presented to the user and generating the number of variations selected.

19. The method of claim 18 further comprising adjusting the scaling of the current user settings for each variation depending on the number of automatic variations that are to be presented.

20. The method of claim 1, wherein the step of presenting a plurality of variations of the image includes displaying the image at the current user settings.

21. The method of claim 20, wherein the step of presenting a plurality of variations of the image includes displaying the image at current user defined compression setting along with three variations generated using the alternative compression settings in a four-up orientation on an output display device.

22. The method of claim 1, wherein a first set of alternative compression settings is derived by scaling the current user setting and a second set of alternative compression settings is derived by scaling the first set of alternative compression settings.

23. The method of claim 1 further comprising receiving user modifications to the current user settings and generating a variation of the image using the modified user settings.

24. The method of claim 23, further including recalculating compression settings for each presented variation of the image using the modified user settings and re-generating each variation using the recalculated compression settings.

25. The method of claim 1, wherein the current user settings define a first quality of the image and each variation generated using the alternative compression settings has a different quality relative to the first quality.

26. The method of claim 2 where the respective estimated download time is presented along with each variation of the image.

27. The method of claim 1, wherein:
   substantially simultaneously presenting the plurality of variations includes presenting information related to a compressed file size of each variation.

28. A computer program for preparing an image for downloading over a link, the computer program includes instructions for causing a computer to:
   receive a user selection for an image to prepare for downloading over a link;
   retrieve current user settings reflective of desired settings for compressing the image, the current user settings defining a first compressed file size for the image;
   automatically derive alternative compression settings, the alternative compression settings including compression settings scaled from the current user settings and defining alternative compressed file sizes for the image, the alternative compressed file sizes being different from the first compressed file size; and
   substantially simultaneously display to a user a plurality of variations of the image where at least one variation is generated using current user settings and at least one variation is generated using one or more of the alternative compression settings that define an alternative compressed file size for the variation.

29. The computer program of claim 28, further including instructions for causing a computer to:
   estimate for each variation of the image a respective amount of time required to download the variation to the user where the estimated time is calculated from an assumed transmission rate of the link and a compressed file size defined of the variation.

30. The computer program of claim 28, further including instructions for causing a computer to:
   determine a file format for the image; and
   use the current user settings designated for the file format to generate a variation of the image.

31. The computer program of claim 30, wherein instructions for causing a computer to determine a file format include instructions for causing a computer to:
   determine an optimum file format for the image based on a predominant nature of the image data.

32. The computer program of claim 31, wherein instructions for causing a computer to determine an optimum format include instructions for causing a computer to:
   calculate an amount of noise in the image;
   set the optimum file format to a JFIF format if the amount of noise is above a predefined threshold, and otherwise set the optimum file format to a GIF format.

33. The computer program of claim 32, wherein instructions for causing a computer to calculate an amount of noise include instructions for causing a computer to:
   for each pixel in the image, compare a relative color change between the pixel and one or more adjacent pixels to derive relative color change data;
   determine an overall color change for the image using the relative color change data for each pixel; and
   compare the overall color change to the threshold value.

34. The compute program of claim 28, wherein the current user settings define a first quality of the image and each variation generated using the alternative compression settings has a different quality relative to the first quality.

35. A computer-implemented method for preparing an image for downloading over a link, the method comprising:
- receiving one or more compression settings for compressing the image and a number specifying how many variations of the image are to be generated, the received compression settings defining a first compressed file size for the image;
- automatically deriving a plurality of alternative compression settings that are different from the received compression settings and define alternative compressed file sizes for the image, the alternative compressed file sizes being different from the first compressed file size;
- using the derived alternative compression settings to generate at least one variation that has an alternative compressed file size in a plurality of variations of the image, the plurality of variations including as many variations as specified by the received number; and
- substantially simultaneously displaying two or more of the plurality of variations of the image.

36. The method of claim 35, wherein:
- automatically deriving a plurality of alternative compression settings includes deriving one or more alternative compression settings based on the received compression settings.

37. The method of claim 36, wherein:
- deriving one or more alternative compression settings based on the received compression settings includes scaling the received compression settings.

38. The method of claim 35, wherein:
- receiving one or more compression settings includes receiving one or more compression settings based on user input.

39. The method of claim 35, further comprising:
- generating a variation in the plurality of variations of the image using the received compression settings.

40. A computer program for preparing an image for downloading over a link, the computer program including instructions for causing a computer to:
- receive one or more compression settings for compressing the image and a number specifying how many variations of the image are to be generated, the received compression settings defining a first compressed file size for the image;
- automatically derive a plurality of alternative compression settings that are different from the received compression settings and define alternative compressed file sizes for the image, the alternative compressed file sizes being different from the first compressed file size;
- use the derived alternative compression settings to generate at least one variation that has an alternative compressed file size in a plurality of variations of the image, the plurality of variations including as many variations as specified by the received number; and
- substantially simultaneously display two or more of the plurality of variations of the image.

41. The computer program of claim 40, wherein instructions for causing a computer to automatically derive a plurality of alternative compression settings include instructions for causing a computer to:
- derive one or more alternative compression settings based on the received compression settings.

42. The computer program of claim 41, wherein instructions for causing a computer to derive one or more alternative compression setting based on the received compression settings include instructions for causing a computer to:
- scale the received compression settings.

43. The computer program of claim 40, wherein instructions for causing a computer to receive one or more compression settings include instructions for causing a computer to:
- receive one or more compression settings based on user input.

44. The computer program of claim 40, further comprising instructions for causing a computer to:
- generate a variation in the plurality of variations of the image using the received compression settings.

* * * * *

UNITED STATES PATENT AND TRADEMARK OFFICE
CERTIFICATE OF CORRECTION

PATENT NO. : 6,862,102 B1
DATED : March 1, 2005
INVENTOR(S) : Douglas E. Meisner, Jon D. Clauson and Douglas C. Shimonek It is certified that error appears in the above-identified patent and that said Letters Patent is hereby corrected as shown below:

Column 10,
Line 42, after "predominant", insert -- nature --;
Line 48, after "that", insert -- are --;

Column 12,
Line 63, delete "compute" and insert -- computer --.

Signed and Sealed this

Seventeenth Day of May, 2005

JON W. DUDAS
*Director of the United States Patent and Trademark Office*